United States Patent
Narayanamurthy

(10) Patent No.: US 8,505,313 B2
(45) Date of Patent: Aug. 13, 2013

(54) THERMAL ENERGY STORAGE AND COOLING SYSTEM WITH SECONDARY REFRIGERANT ISOLATION

(75) Inventor: Ramachandran Narayanamurthy, Loveland, CO (US)

(73) Assignee: Ice Energy Holdings, Inc., Glendale, CA (US)

( * ) Notice: Subject to any disclaimer, the term of this patent is extended or adjusted under 35 U.S.C. 154(b) by 449 days.

(21) Appl. No.: 12/950,046

(22) Filed: Nov. 19, 2010

(65) Prior Publication Data

US 2011/0061410 A1    Mar. 17, 2011

Related U.S. Application Data

(60) Continuation of application No. 12/879,416, filed on Sep. 10, 2010, which is a division of application No. 12/100,893, filed on Apr. 10, 2008, now Pat. No. 7,793,515, which is a division of application No. 11/208,074, filed on Aug. 18, 2005, now Pat. No. 7,363,772.

(60) Provisional application No. 60/602,774, filed on Aug. 18, 2004.

(51) Int. Cl.
    *F25D 3/00* (2006.01)
(52) U.S. Cl.
    USPC ................................. 62/59; 62/434
(58) Field of Classification Search
    USPC ................. 62/59, 332, 333, 430–439, 509
    See application file for complete search history.

(56) References Cited

U.S. PATENT DOCUMENTS

| 1,969,187 A | 8/1934 | Schutt |
| 2,512,576 A | 6/1950 | Cross |
| 2,661,576 A | 12/1953 | Gartner |
| 2,737,027 A | 3/1956 | Kleist |
| 3,156,101 A | 11/1964 | McGuffey |
| 3,746,084 A | 7/1973 | Ostbo |
| 4,073,306 A | 2/1978 | Neyer |
| 4,294,078 A | 10/1981 | MacCracken |
| 4,403,645 A | 9/1983 | MacCracken |
| 4,565,069 A | 1/1986 | MacCracken |
| 4,608,836 A | 9/1986 | MacCracken et al. |
| 4,609,036 A | 9/1986 | Schrader |

(Continued)

FOREIGN PATENT DOCUMENTS

| DE | 100 57 834 A1 | 9/1957 |
| DE | 298 23 175 U1 | 7/1999 |

(Continued)

OTHER PUBLICATIONS

International Search Report for PCT/US2005/029535, International Searching Authority, May 12, 2005, pp. 1-12.

(Continued)

*Primary Examiner* — Melvin Jones
(74) *Attorney, Agent, or Firm* — Paul M. Thompson; Cochran Freund & Young LLC

(57) ABSTRACT

Disclosed are a method and device for a refrigerant-based thermal storage system wherein a condensing unit and an ice-tank heat exchanger can be isolated through a second heat exchanger. The disclosed embodiments provide a refrigerant-based ice storage system with increased reliability, lower cost components, and reduced power consumption compared to non-isolated systems.

20 Claims, 8 Drawing Sheets

(56) References Cited

U.S. PATENT DOCUMENTS

| | | | |
|---|---|---|---|
| 4,619,317 A | 10/1986 | Disselbeck et al. | |
| 4,637,219 A * | 1/1987 | Grose | 62/199 |
| 4,735,064 A | 4/1988 | Fischer | |
| 4,893,476 A | 1/1990 | Bos et al. | |
| 4,916,916 A | 4/1990 | Fischer | |
| 4,921,100 A | 5/1990 | Krause | |
| 4,940,079 A | 7/1990 | Best et al. | |
| 4,964,279 A | 10/1990 | Osborne | |
| 5,005,368 A | 4/1991 | MacCracken et al. | |
| 5,109,920 A | 5/1992 | Merryfull | |
| 5,211,029 A | 5/1993 | Uselton et al. | |
| 5,237,832 A | 8/1993 | Alston | |
| 5,255,526 A | 10/1993 | Fischer | |
| 5,307,642 A | 5/1994 | Dean | |
| 5,366,153 A | 11/1994 | Swenson | |
| 5,383,339 A | 1/1995 | McCloskey et al. | |
| 5,423,378 A | 6/1995 | Dillenbeck et al. | |
| 5,467,812 A | 11/1995 | Dean et al. | |
| 5,598,720 A | 2/1997 | MacCracken et al. | |
| 5,647,225 A * | 7/1997 | Fischer et al. | 62/434 |
| 5,678,626 A | 10/1997 | Gilles | |
| 5,682,752 A | 11/1997 | Dean | |
| 5,715,202 A | 2/1998 | Harima | |
| 5,720,178 A | 2/1998 | Silvetti et al. | |
| 5,927,101 A | 7/1999 | Oh | |
| 6,112,543 A | 9/2000 | Feuerecker et al. | |
| 6,158,499 A | 12/2000 | Rhodes et al. | |
| 6,247,522 B1 | 6/2001 | Kaplan et al. | |
| 6,250,098 B1 | 6/2001 | Huang | |
| 6,260,376 B1 | 7/2001 | Khelifa et al. | |
| 6,474,089 B1 | 11/2002 | Chen | |
| D501,490 S | 2/2005 | Kerrigan | |
| 7,124,594 B2 | 10/2006 | McRell | |
| 7,152,413 B1 | 12/2006 | Anderson | |
| 7,162,878 B2 | 1/2007 | Narayanamurthy et al. | |
| 7,363,772 B2 | 4/2008 | Narayanamurthy | |
| 7,421,846 B2 | 9/2008 | Narayanamurthy et al. | |
| 7,503,185 B2 | 3/2009 | Narayanamurthy | |
| 7,690,212 B2 | 4/2010 | Narayanamurthy et al. | |
| 7,793,515 B2 | 9/2010 | Narayanamurthy | |
| 2002/0162342 A1 | 11/2002 | Weng et al. | |
| 2004/0221589 A1 | 11/2004 | Dube et al. | |

FOREIGN PATENT DOCUMENTS

| | | |
|---|---|---|
| DE | 198 31 127 A1 | 3/2001 |
| DE | 1 015 019 | 6/2002 |
| EP | 0 641 978 B2 | 7/1998 |
| EP | 1 441 183 A1 | 7/2004 |
| JP | 58-217133 | 12/1983 |
| JP | 60036835 A2 | 2/1985 |
| JP | A-2000-266368 | 1/1996 |
| JP | 8-226682 | 9/1996 |
| JP | 10-339483 | 12/1998 |
| JP | A-2001-296068 | 12/1998 |
| JP | 8-14628 | 9/2000 |
| JP | A-2000-249420 | 10/2001 |
| WO | WO 2005/001345 A1 | 1/2005 |
| WO | WO 2005/038367 | 4/2005 |
| WO | WO 2005/116547 A1 | 12/2005 |
| WO | WO 2006/023716 A1 | 3/2006 |

OTHER PUBLICATIONS

International Search Report for PCT/US2005/042409, International Searching Authority, Oct. 5, 2006, pp. 1-7.
Notice of Allowance, U.S. Appl. No. 11/208,074, pp. 1-14.
Notice of Allowance, U.S. Appl. No. 12/100,893, pp. 1-15.
Non Final Office Action, U.S. Appl. No. 11/284,533, pp. 1-11.

* cited by examiner

VALVE STATUS CONDITIONS FOR A THERMAL ENERGY STORAGE AND COOLING SYSTEM WITH SECONDARY REFRIGERANT ISOLATION

| System Mode | Valve | Condition |
|---|---|---|
| Ice Make (charging) Figure 3 | 1 | Closed |
| | 2 | = |
| | 3 | \|\| |
| | 4 | ⊐ |
| Ice Melt (cooling) Figure 4 | 1 | Open |
| | 2 | ⌊ |
| | 3 | ⌊ |
| | 4 | ⌋ |
| Direct Cooling (bypass) Figure 5 | 1 | Open |
| | 2 | ⌋ |
| | 3 | Closed |
| | 4 | ⌋ |

FIGURE 2

THERMAL ENERGY STORAGE AND COOLING SYSTEM WITH SECONDARY REFRIGERANT ISOLATION

CROSS REFERENCE TO RELATED APPLICATIONS

The present application is a continuation application of Divisional Application No. 12/879,416, filed on Sep. 10, 2010, which is a divisional of U.S. patent application Ser. No. 12/100,893, filed on Apr. 10, 2008 which issued as U.S. Pat. No. 7,793,515 on Sep. 14, 2010, which is a divisional of U.S. patent application Ser. No. 11/208,074, filed on Aug. 18, 2005, which issued as U.S. Pat. No. 7,363,772 on Apr. 29, 2008, which claims the benefit of U.S. Provisional Application No. 60/602,774, entitled "Refrigerant-Based Energy Storage and Cooling System with Secondary Refrigerant Isolation", filed Aug. 18, 2004, the entire disclosure of which is hereby specifically incorporated by reference for all that it discloses and teaches.

BACKGROUND OF THE INVENTION a. Field of the Invention

The present invention relates generally to systems providing stored thermal energy in the form of ice, and more specifically to refrigerant-based ice storage air conditioning systems used to provide cooling load during peak electrical demand.

b. Description of the Background

With the increasing demands on peak demand power consumption, ice storage has been utilized to shift air conditioning power loads to off-peak times and rates. A need exists not only for load shifting from peak to off-peak periods, but also for increases in air conditioning unit capacity and efficiency. Current air conditioning units having energy storage systems have had limited success due to several deficiencies including reliance on water chillers that are practical only in large commercial buildings and have difficulty achieving high-efficiency. In order to commercialize advantages of thermal energy storage in large and small commercial buildings, thermal energy storage systems must have minimal manufacturing costs, maintain maximum efficiency under varying operating conditions, emanate simplicity in the refrigerant management design, and maintain flexibility in multiple refrigeration or air conditioning applications.

Systems for providing thermal stored energy have been previously contemplated in U.S. Pat. Nos. 4,735,064, 4,916,916, both issued to Harry Fischer, U.S. Pat. No. 5,647,225 issued to Fischer et al., U.S. patent application Ser. No. 10/967,114 filled Oct. 15, 2004 by Narayanamurthy et al., U.S. patent application Ser. No. 11/112,861 filled Apr. 22, 2005 by Narayanamurthy et al., and U.S. patent application Ser. No. 11/138,762 filed May 25, 2005 by Narayanamurthy et al. All of these patents utilize ice storage to shift air conditioning loads from peak to off-peak electric rates to provide economic justification and are hereby incorporated by reference herein for all they teach and disclose.

SUMMARY OF THE INVENTION

An embodiment of the present invention may therefore comprise a thermal energy storage and cooling system comprising: a refrigerant loop comprising: a condensing unit, the condensing unit comprising a compressor and a condenser; an expansion device connected downstream of the condensing unit; and, an evaporator on a primary side of an isolating heat exchanger located downstream of the expansion device; a cooling loop on a secondary side of the isolating heat exchanger in thermal communication with the primary side of the isolating heat exchanger comprising: a tank filled with a fluid capable of a phase change between liquid and solid and containing a primary heat exchanger therein, the primary heat exchanger in thermal communication with the secondary side of the isolating heat exchanger, the cooling loop that allows transfer of cooling from the secondary side of the isolating heat exchanger to the primary heat exchanger to cool the fluid and to freeze at least a portion of the fluid within the tank in a first time period, the cooling loop that allows transfer of cooling from the primary heat exchanger to the secondary side of the isolating heat exchanger to cool the primary side of the isolating heat exchanger in a second time period; and, a load heat exchanger in thermal communication with the isolating heat exchanger and the condensing unit that allows cooling capacity to be transferred from the condensing unit to the load heat exchanger or the primary heat exchanger to the load heat exchanger.

An embodiment of the present invention may further comprise a method of providing load cooling with a thermal energy storage and cooling system comprising: storing cooling capacity in a first time period comprising: compressing and condensing a refrigerant with a condensing unit in a refrigerant loop; expanding the refrigerant downstream of the condensing unit; and, evaporating the refrigerant on a primary side of an isolating heat exchanger located downstream of the expansion device; transferring cooling from the expanded refrigerant to a secondary side of the isolating heat exchanger; transferring cooling from the secondary side of the isolating heat exchanger to a primary heat exchanger located in a tank filled with a fluid capable of a phase change between liquid and solid; and, transferring cooling from the primary heat exchanger to the fluid to freeze at least a portion of the fluid within the tank to provide stored cooling capacity; utilizing the stored cooling capacity in a second time period comprising: transferring cooling from the fluid to the primary heat exchanger; transferring cooling from the primary heat exchanger to the isolating heat exchanger; and, transferring cooling from the isolating heat exchanger to a load heat exchanger; providing direct cooling in a third time period comprising: compressing and condensing the refrigerant with the condensing unit in the refrigerant loop; expanding the refrigerant downstream of the condensing unit; and, evaporating the refrigerant downstream of the expansion device; and, transferring cooling from the expanded refrigerant to the load heat exchanger.

BRIEF DESCRIPTION OF THE DRAWINGS

In the drawings,

FIG. 2 is a table representing valve status conditions for the refrigerant-based thermal energy storage and cooling system with secondary refrigerant isolation illustrated in FIG. 1.

DETAILED DESCRIPTION OF THE INVENTION

Figure 1:
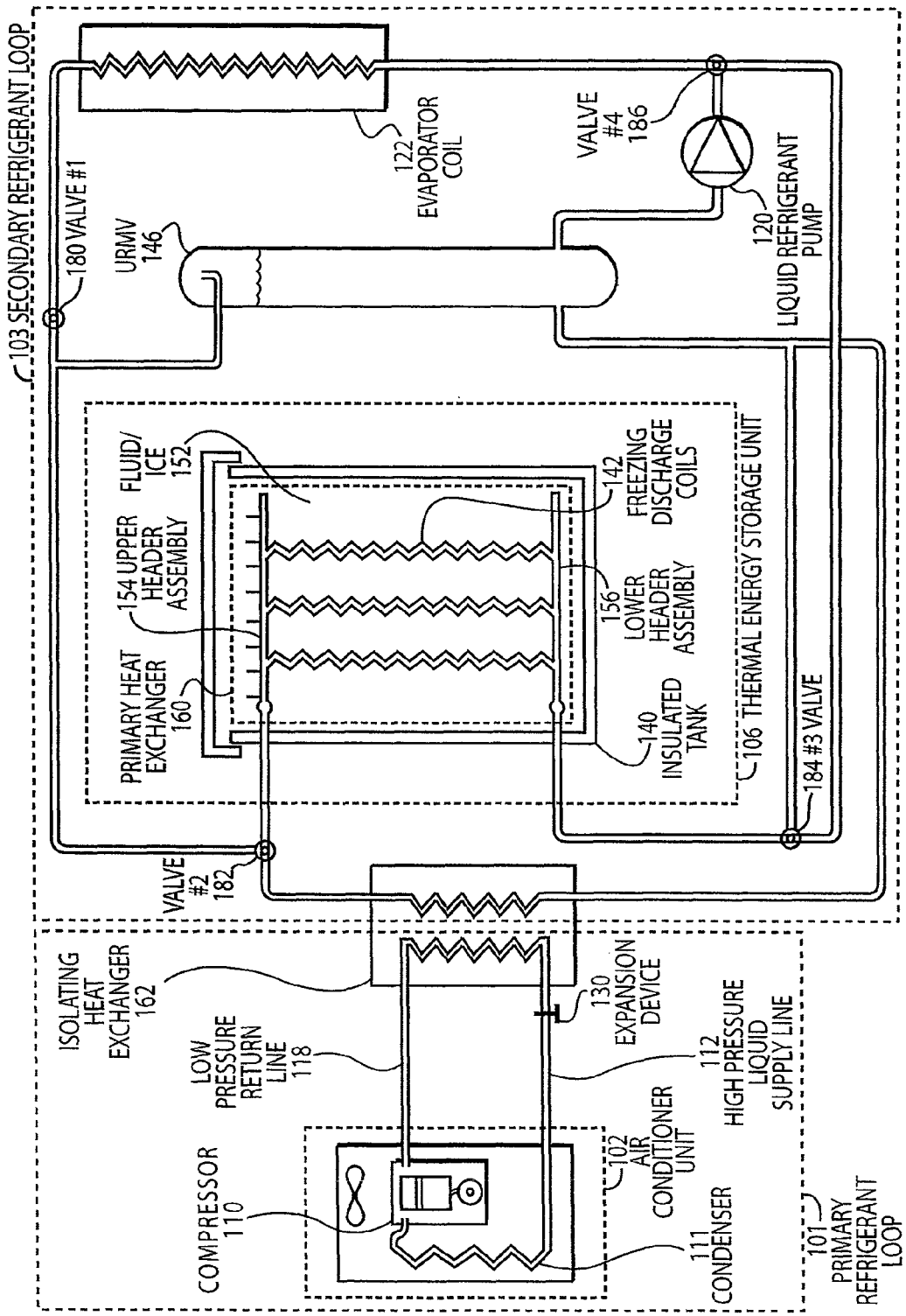
FIG. 1 illustrates an embodiment of a refrigerant-based thermal energy storage and cooling system with secondary refrigerant isolation.

While this invention is susceptible to embodiment in many different forms, there is shown in the drawings and will be described herein in detail specific embodiments thereof with the understanding that the present disclosure is to be considered as an exemplification of the principles of the invention and is not to be limited to the specific embodiments described.

The disclosed embodiments overcome the disadvantages and limitations of the prior art by providing a refrigerant-based thermal storage system method and device wherein a condensing unit and an ice-tank heat exchanger can be isolated through a second heat exchanger. As illustrated in FIG. 1, an air conditioner unit 102 utilizing a compressor 110 to compress cold, low pressure refrigerant gas to hot, high-pressure gas. Next, a condenser 111 removes much of the heat in the gas and discharges the heat to the atmosphere. The refrigerant comes out of the condenser as a warm, high-pressure liquid refrigerant delivered through a high-pressure liquid supply line 112 to an isolating heat exchanger 162 through an expansion valve 130. This expansion valve 130 may be a conventional thermal expansion valve, a mixed-phase regulator and surge vessel (reservoir) or the like. Low-pressure vapor phase and liquid refrigerant is then returned to compressor 110 via low pressure return line 118 completing the primary refrigeration loop.

Cooling is transferred to a secondary refrigeration loop including a thermal energy storage unit 106 through the isolating heat exchanger 162. The thermal energy storage unit 106 comprises an insulated tank 140 that houses the primary heat exchanger 160 surrounded by fluid/ice depending on the current system mode. The primary heat exchanger 160 further comprises a lower header assembly 156 connected to an upper header assembly 154 with a series of freezing and discharge coils 142 to make a fluid/vapor loop within the insulated tank 140. The upper and lower header assemblies 154 and 156 communicate externally of the thermal energy storage unit 106 with inlet and outlet connections.

An evaporator coil 122 is connected within the secondary closed loop refrigeration circuit to the isolating heat exchanger 162 to transmit cooling from the air conditioner unit 102 to a load in one mode (isolated direct cooling) of the system. The evaporator coil 122 is also connected within the secondary closed loop refrigeration circuit to the primary heat exchanger 160 to receive cooling in another mode (thermal storage cooling). Valves 180-186 are placed in various places within the secondary refrigerant circuits to allow these multi-mode conditions with minimal complexity and plumbing. The valve types and configurations presented are specified for demonstrative purposes and any variety of valve or circuit configurations may be used in conjunction with the disclosed systems and fall within the scope of the invention. Acting as a collector and phase separator of multi-phase refrigerant, an accumulator or universal refrigerant management vessel (URMV) 146 is in fluid communication with both the thermal energy storage unit 106 and the evaporator coil 122. A liquid refrigerant pump 120 is placed on the downstream side of the URMV 146 to pump refrigerant through refrigerant loops to either the evaporator coil 122 or the thermal energy storage unit 106 depending upon the current mode.

The embodiment illustrated in FIG. 1 utilizes the air conditioner unit 102 as the principal cooling source. The thermal energy storage unit 106 operates using an independent refrigerant (or phase change) loop that transfers the heat between the air conditioner unit 102 and the thermal energy storage unit 106 or a load, represented by the evaporator coil 122. The disclosed embodiment functions in two principal modes of operation, ice-make (charging) and ice-melt (cooling) mode.

In ice-make mode, compressed high-pressure refrigerant leaves the air conditioner unit 102 through high-pressure liquid supply line 112 and is fed through an expansion valve 130 to cool the primary side of the isolating heat exchanger 162. Warm liquid and vapor phase refrigerant leaves the isolating heat exchanger 162, returns to the air conditioner unit 102 through the low pressure return line 118 and is fed to the compressor 110 and re-condensed into liquid. The heat transfer between the primary loop and the secondary loop is accomplished by the isolating heat exchanger 162. Fluid leaving the isolating heat exchanger 162 on the secondary side flows to the URMV 146 where the cooled liquid phase refrigerant is accumulated and stored. The fluid leaves the URMV 146 and is pumped by a liquid refrigerant pump 120 to the thermal energy storage unit 106 where it enters the primary heat exchanger 160 through the lower header assembly 156 and is then distributed through the freezing coils 142 which act as an evaporator. Cooling is transmitted from the freezing coils 142 to the surrounding fluid 152 that is confined within the insulated tank 140 and eventually produces a block of ice surrounding the freezing coils 142 and storing thermal energy in the process. Warm liquid and vapor phase refrigerant leave the freezing coils 142 through the upper header assembly 154 and exit the thermal energy storage unit 106 returning to the isolating heat exchanger 162 being cooled and condensed once again.

In ice-melt mode, cool liquid refrigerant leaves URMV 146 and is pumped by a liquid refrigerant pump 120 to the evaporator coil 122 where cooling is transferred to a load. Warm liquid and vapor phase refrigerant leave evaporator coil 122 where the liquid phase is returned to the upper portion of the URMV 146 and vapor phase refrigerant is fed to the upper header assembly 154 of the thermal energy storage unit 106. Vapor phase refrigerant proceeds through the discharge coils 142 drawing cooling from the block of ice 152 surrounding the coils, where warm refrigerant is cooled and condensed to cool liquid phase refrigerant. This cool liquid phase refrigerant leaves the primary heat exchanger 160 via the lower header assembly 156 and exits the thermal energy storage unit 106 where it is fed into the lower portion of the URMV 146. The two principal modes of operation, ice-make and ice-melt performed with the apparatus of FIG. 1 are accomplished with the use of a series of valves 180-186 that control the flow of refrigerant through various apparatus which can perform dual functions depending upon the mode.

Because the system isolates a primary refrigerant loop 101 from a secondary refrigerant loop 103, the system additionally allows the use of different refrigerants to be used within the device. For example, one type of highly efficient refrigerant that may have properties that would discourage use within a dwelling (such as propane) may be utilized within the primary refrigerant loop 101, while a more suitable refrigerant (such as R-22 or R-410A) can be used for the secondary refrigerant loop 103 that may enter the dwelling. This allows greater versatility and efficiency of the system while maintaining safety, environmental and application issues to be addressed.

Figure 3:
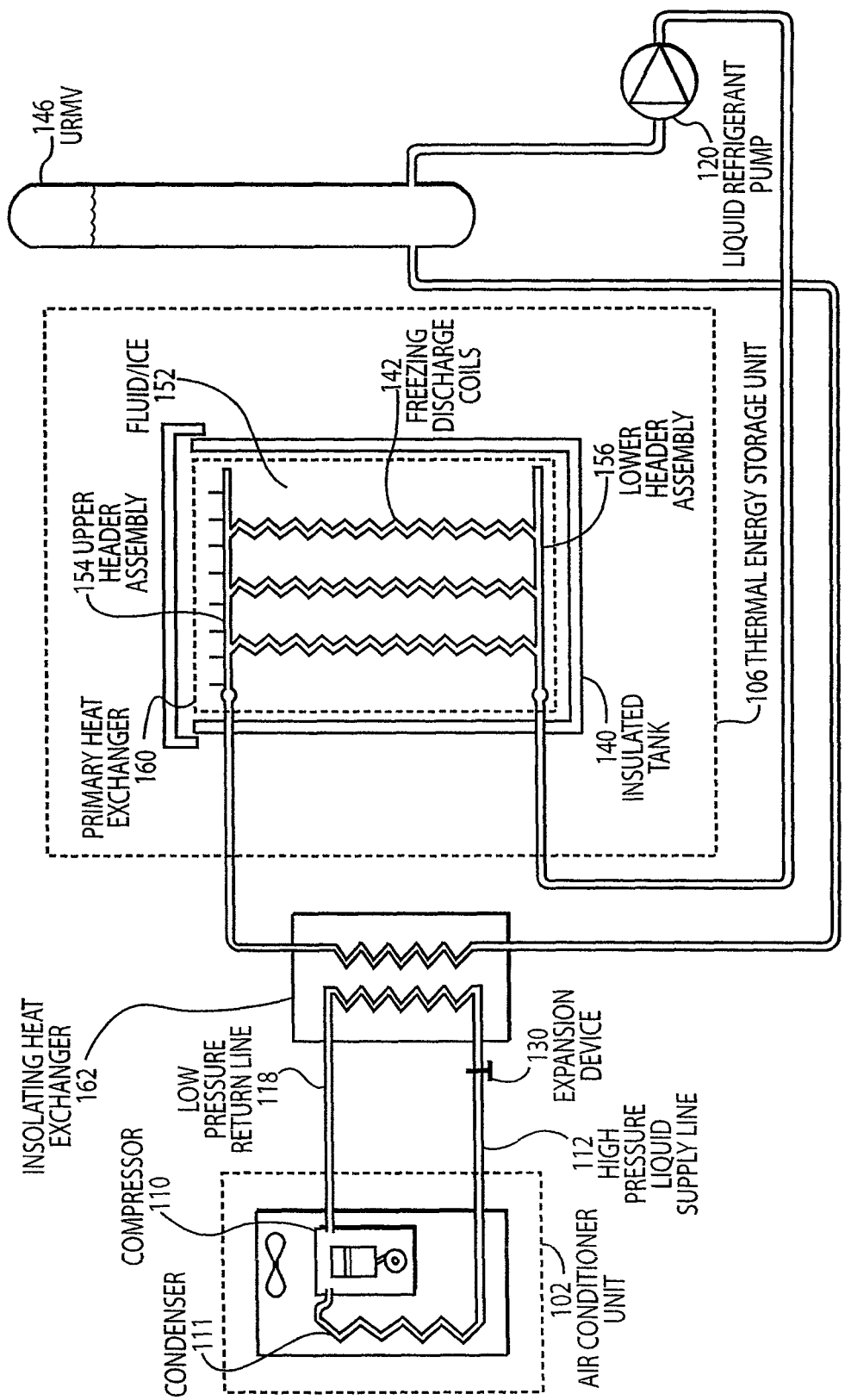
FIG. 3 illustrates a configuration of a refrigerant-based thermal energy storage and cooling system with secondary refrigerant isolation during an ice-make (charging) cycle.

FIG. 2 is a table representing valve status conditions for the refrigerant-based energy storage and cooling system with secondary refrigerant isolation 200 that is illustrated in FIG. 1. As shown in the table of FIG. 2, during the ice-make process, valve #1 180 is in a closed condition, valve #2 182 allows flow only from the thermal energy storage unit 106 to the isolating heat exchanger 162, and valve #4 186 directs flow from the liquid refrigerant pump 120 to the thermal energy storage unit 106. With the valves in this state, the evaporator coil is removed from the secondary loop. This causes refrigerant to flow through the primary heat exchanger 160, which acts as an evaporator, and returns refrigerant through valve #2 to the isolating heat exchanger 162 acting as a condenser. Valve #3 184 allows flow only between the refrigerant pump and the thermal energy storage unit 106. With each of the valves 180-186 in this ice-make condition, the system flows as shown in FIG. 3.

Figure 4:
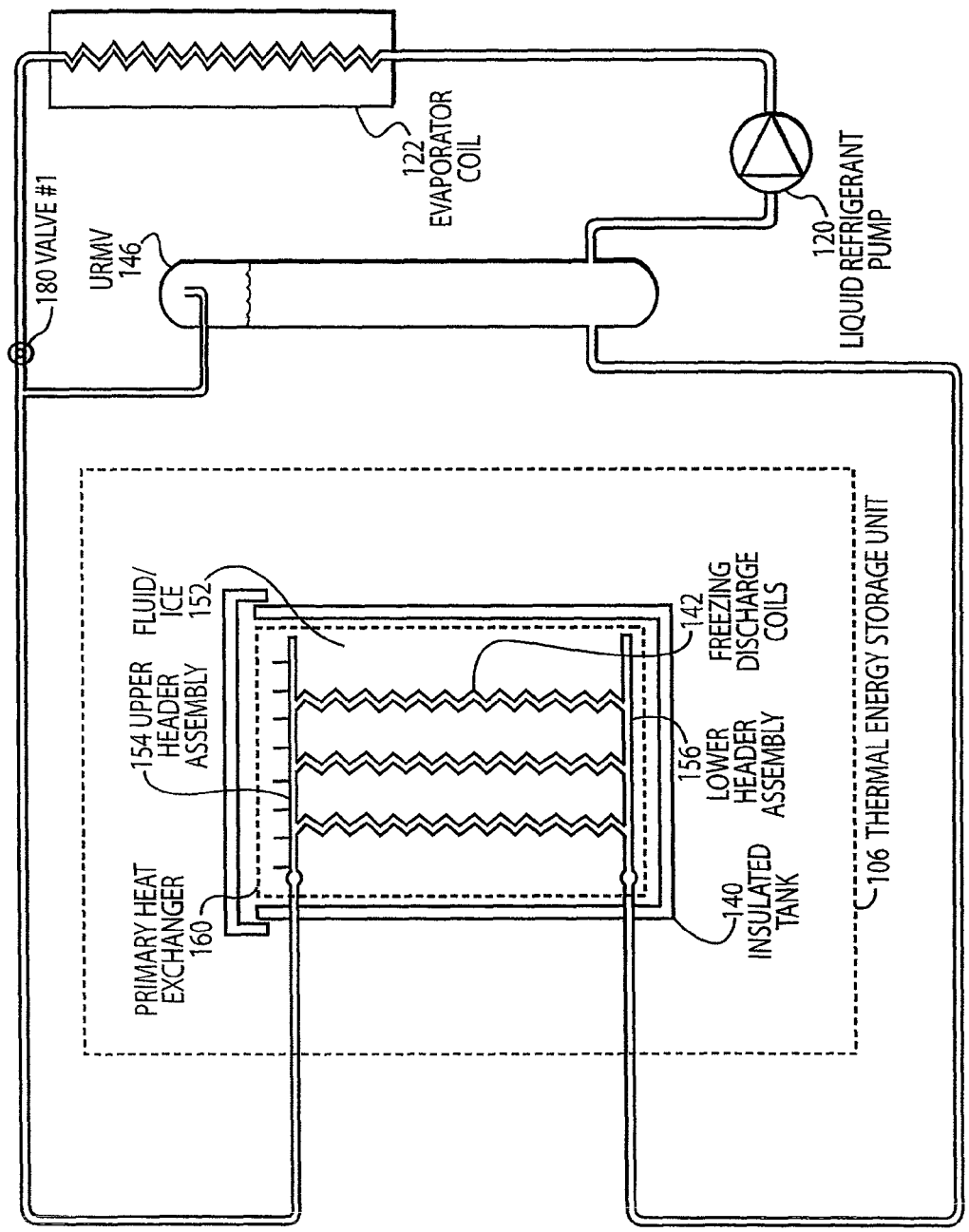
FIG. 4 illustrates a configuration of a refrigerant-based thermal energy storage and cooling system with secondary refrigerant isolation during an ice-melt (cooling) cycle.

During the ice-melt process, valve #4 186 directs flow from the liquid refrigerant pump 120 to the evaporator coil 122, valve #1 180 is in an open condition, and valve #2 182 allows flow only from the evaporator coil 122 to the thermal energy storage unit 106 and the URMV 146. With the valves in this state, the evaporator coil receives cooling to transfer to a load. This causes refrigerant to flow through the primary heat exchanger 160 in the opposite direction as in the ice-make mode and allows the primary heat exchanger to act as a condenser. Valve #3 184 allows flow only between the thermal energy storage unit 106 and the URMV 146. With each of the valves 180-186 in this ice-melt condition, the system flows as shown in FIG. 4.

As described in the above embodiment, the isolating heat exchanger 162 acts as an evaporator for the air conditioner unit 102 and as a condenser for the thermal energy storage unit 106. As a result, the air conditioner unit 102 operates at a lower suction temperature, but the loss in efficiency is overpowered by the decrease in cost of the system. During the ice-melt process, there are two options available. The refrigerant can be fed from the thermal energy storage unit 106 to the evaporator coil 122 as shown in FIG. 1, or the evaporator coil 122 can be utilized as yet another heat exchanger to exchange heat with yet another circuit. This option will entail usage of an additional pump to drive the additional circuit.

Additionally shown in the table of FIG. 2 is a condition in which the thermal energy storage capacity of the system may be bypassed and the air conditioner unit 102 is utilized to provide direct cooling to the evaporator coil 122. During the direct cooling process, valve #1 180 is in an open condition, valve #2 182 allows flow from the evaporator coil 122 to the isolating heat exchanger 162 and the URMV 146, valve #3 184 is closed and valve #4 186 directs flow from the liquid refrigerant pump 120 to the evaporator coil 122. With the valves in this state, the thermal energy storage unit is removed from the secondary loop. This causes refrigerant to flow through the isolating heat exchanger 162, which acts as a condenser, and returns refrigerant through the URMV 146 to the evaporator coil 122. With each of the valves 180-186 in this direct cooling condition, the system flows as shown in FIG. 5.

FIG. 3 illustrates a configuration of the refrigerant-based energy storage and cooling system with secondary refrigerant isolation of FIG. 1 during an ice-make (charging) cycle. With each of the valves 180-186 in the ice-make mode, as detailed in the table of FIG. 2, compressed high-pressure refrigerant leaves the air conditioner unit 102 through the high-pressure liquid supply line 112 and is fed through an expansion valve 130 to cool the primary side of the isolating heat exchanger 162. Warm liquid and vapor phase refrigerant leave the isolating heat exchanger 162 and returns to the air conditioner unit 102 through the low pressure return line 118 and is fed to the compressor 110 where it is re-condensed into liquid. The heat transfer between the primary loop and the secondary loop is accomplished by the isolating heat exchanger 162. Fluid leaving the isolating heat exchanger 162 on the secondary side flows to the URMV 146 where the cooled liquid phase refrigerant is accumulated. The fluid leaves the URMV 146 and is pumped by a liquid refrigerant pump 120 to the thermal energy storage unit 106 where it enters the primary heat exchanger 160 through the lower header assembly 156 and is then distributed through the freezing coils 142 which act as an evaporator. Cooling is transmitted from the freezing coils 142 to the surrounding fluid 152 that is confined within insulated tank 140 and eventually produces a block of ice surrounding the freezing coils 142 and storing thermal energy in the process. Cool liquid and vapor phase refrigerant leave the freezing coils 142 through upper header assembly 154 and exit the thermal energy storage unit 106 and return to the isolating heat exchanger 162 and are cooled and condensed once again.

FIG. 4 illustrates a configuration of the refrigerant-based energy storage and cooling system with secondary refrigerant isolation of FIG. 1 during an ice-melt (cooling) cycle. With each of the valves 180-186 in the ice-melt mode, as detailed in the table of FIG. 2, cool liquid refrigerant leaves URMV 146 and is pumped by a liquid refrigerant pump 120 to the evaporator coil 122 where cooling is transferred to a load. Warm liquid and vapor phase refrigerant leave evaporator coil 122 where the liquid phase is returned to the upper portion of the URMV 146 and vapor phase refrigerant is fed to the upper header assembly 154 of the thermal energy storage unit 106. Vapor phase refrigerant proceeds through the discharge coils 142 drawing cooling from the block of ice 152 surrounding the coils where it is cooled and condensed to cool liquid phase refrigerant. This cool liquid phase refrigerant leaves the primary heat exchanger 160 via the lower header assembly 156 and exits the thermal energy storage unit 106 where it is fed into the lower portion of the URMV 146.

Figure 5:
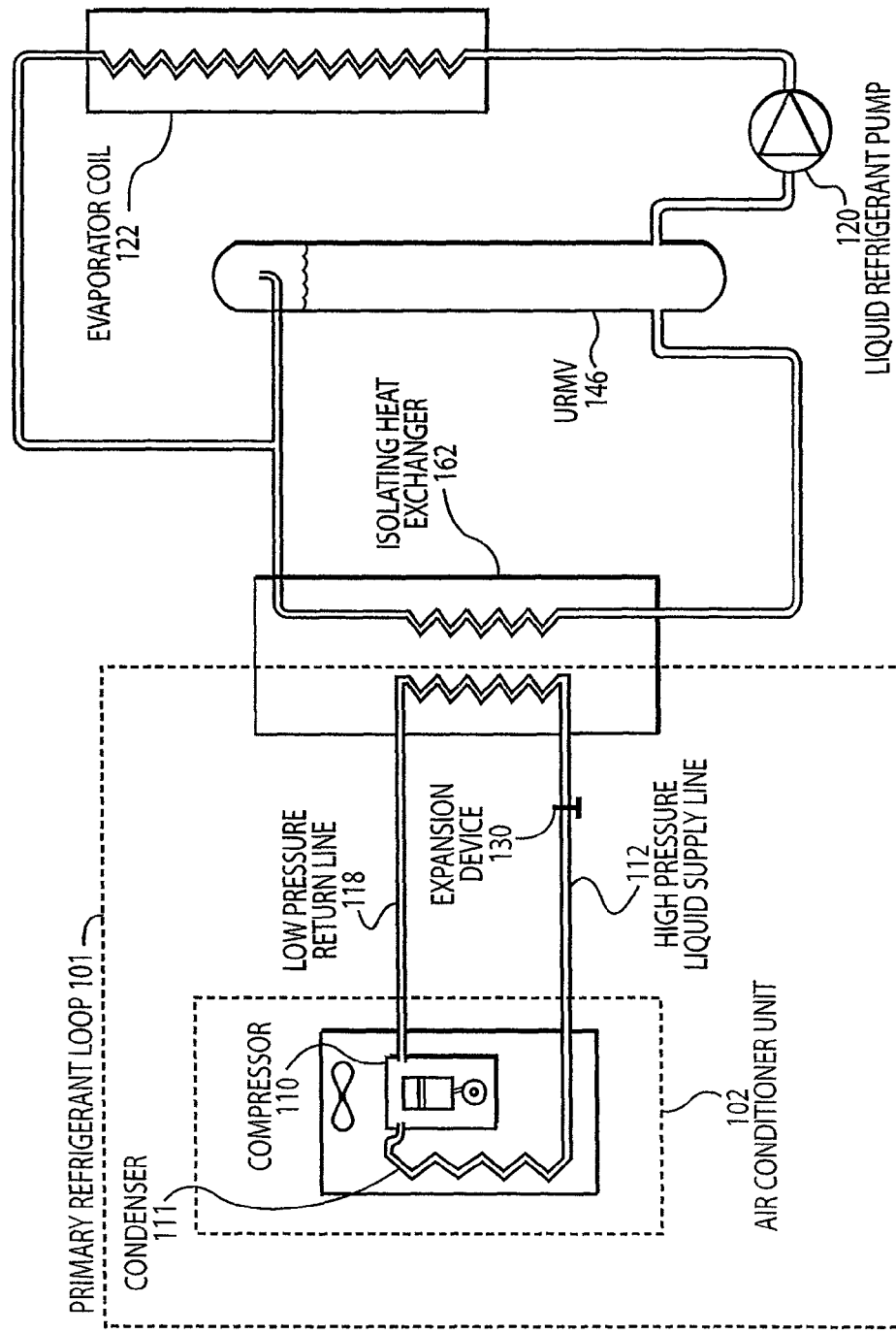
FIG. 5 illustrates a configuration of a refrigerant-based thermal energy storage and cooling system with secondary refrigerant isolation during a direct cooling (bypass) cycle.

FIG. 5 illustrates a configuration of the refrigerant-based energy storage and cooling system with secondary refrigerant isolation of FIG. 1 during a direct cooling cycle. In this configuration the thermal energy storage unit is bypassed and cooling is delivered directly form the condenser 111 to the evaporator coil 122 through the isolating heat exchanger 162. With each of the valves 180-186 in the direct cooling mode, as detailed in the table of FIG. 2, the air conditioning unit 102 transfers cooling to the primary side of the isolating heat exchanger 162 where cooling is transferred to the secondary side to cool and condense refrigerant in the secondary loop. Cooled liquid refrigerant leaves the isolating heat exchanger 162 and is accumulated in the URMV 146. Cool liquid refrigerant leaves URMV 146 and is pumped by a liquid refrigerant pump 120 to the evaporator coil 122 where cooling is transferred to a load. Warm liquid and vapor phase refrigerant leave evaporator coil 122 where the liquid phase is returned to the upper portion of the URMV 146 and vapor phase refrigerant is fed back to the isolating heat exchanger 162.

Figure 6:
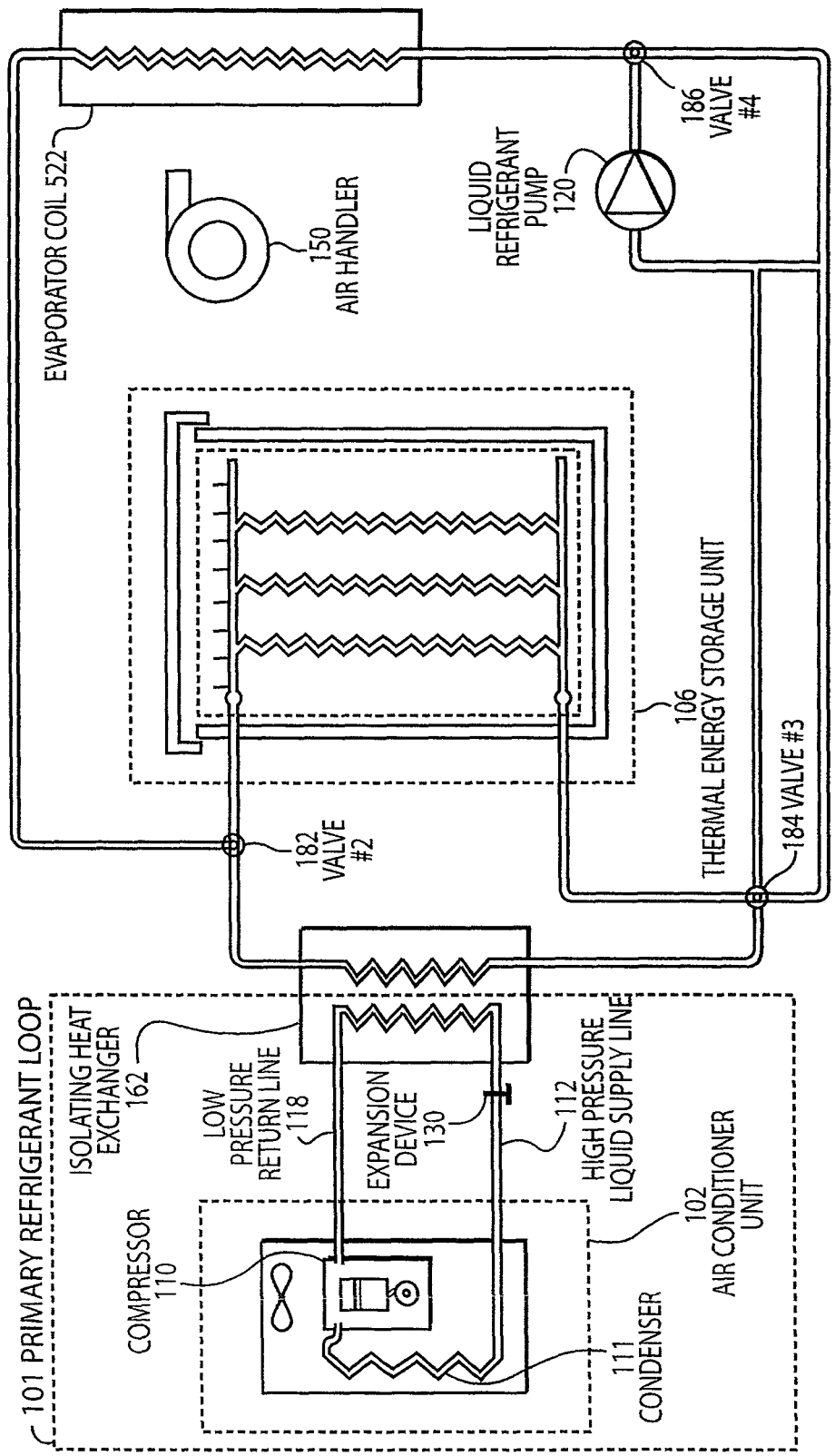
FIG. 6 illustrates another embodiment of a refrigerant-based thermal energy storage and cooling system with secondary refrigerant isolation.

FIG. 6 illustrates another embodiment of a refrigerant-based energy storage and cooling system with secondary refrigerant isolation. This embodiment functions without the need for an accumulator vessel or URMV reducing cost and complexity of the system. The embodiment of FIG. 6 utilizes the same primary refrigeration loop 101 as shown in FIG. 1 using an air conditioner unit 102 with a compressor 110 and condenser 111 creating high-pressure liquid refrigerant delivered through a high-pressure liquid supply line 112 to an isolating heat exchanger 162 through an expansion valve 130 and low-pressure refrigerant then being returned to compressor 110 via low pressure return line 118. Cooling is transferred to a secondary refrigeration loop including a thermal energy storage unit 106 through the isolating heat exchanger 162. This thermal energy storage unit 106 is structurally comparable to that depicted in FIG. 1, and acts as an evaporator in the ice-make mode and as a condenser in the ice-melt mode. An evaporator coil 122 in conjunction with an air handler 150 is connected within the secondary closed loop refrigeration circuit to the isolating heat exchanger 162 to transmit cooling from the primary refrigeration loop 101 and provide isolated, direct cooling in one mode.

The evaporator coil 122 is also connected within the closed secondary loop refrigeration circuit to the thermal energy storage unit 106 to receive cooling in another mode (thermal storage cooling). Valves 182-186 are placed in various places within the secondary refrigerant circuits to allow these multimode conditions with minimal complexity and plumbing. The valve types and configurations presented are specified for demonstrative purposes and any variety of valve or circuit configurations may be used in conjunction with the disclosed systems and fall within the scope of the invention. A liquid refrigerant pump 120 in placed in the secondary refrigeration loop to pump refrigerant to either the evaporator coil 122 or the thermal energy storage unit 106 depending upon the current mode.

The present embodiment also functions in two principal modes of operation, ice-make and ice-melt mode. In ice-make mode, the primary refrigerant loop 101 is used to cool the primary side of the isolating heat exchanger 162 that transfers heat to the secondary loop. Fluid leaving the isolating heat exchanger 162 on the secondary side flows to the liquid refrigerant pump 120 where the cooled liquid phase refrigerant is distributed to the thermal energy storage unit 106 acting as an evaporator. The liquid refrigerant pump 120 is placed below the level of the isolating heat exchanger 162 so that sufficient liquid head above the pump can be maintained. Cooling is transmitted to fluid that is confined within the thermal energy storage unit 106 thus storing thermal energy. Warm liquid and vapor phase refrigerant leaves the thermal energy storage unit 106 and returns to the isolating heat exchanger 162 and is cooled and condensed once again.

In ice-melt mode, cool liquid refrigerant is drawn from the thermal energy storage unit 106 and is pumped by a liquid refrigerant pump 120 to the evaporator coil 122 where cooling is transferred to a load with the aid of an air handler 150. Warm mixture of liquid and vapor phase refrigerant leaves the evaporator coil 122 where the mixture is returned to the thermal energy storage unit 106 now acting as a condenser. Vapor phase refrigerant is cooled and condensed by drawing cooling from the cold fluid or ice. As with the embodiment of FIG. 1, two principal modes of operation, ice-make and ice-melt are performed with the use of a series of valves 182-186 that control the flow of refrigerant through various apparatus which can perform multiple functions depending upon the mode.

Figure 7:
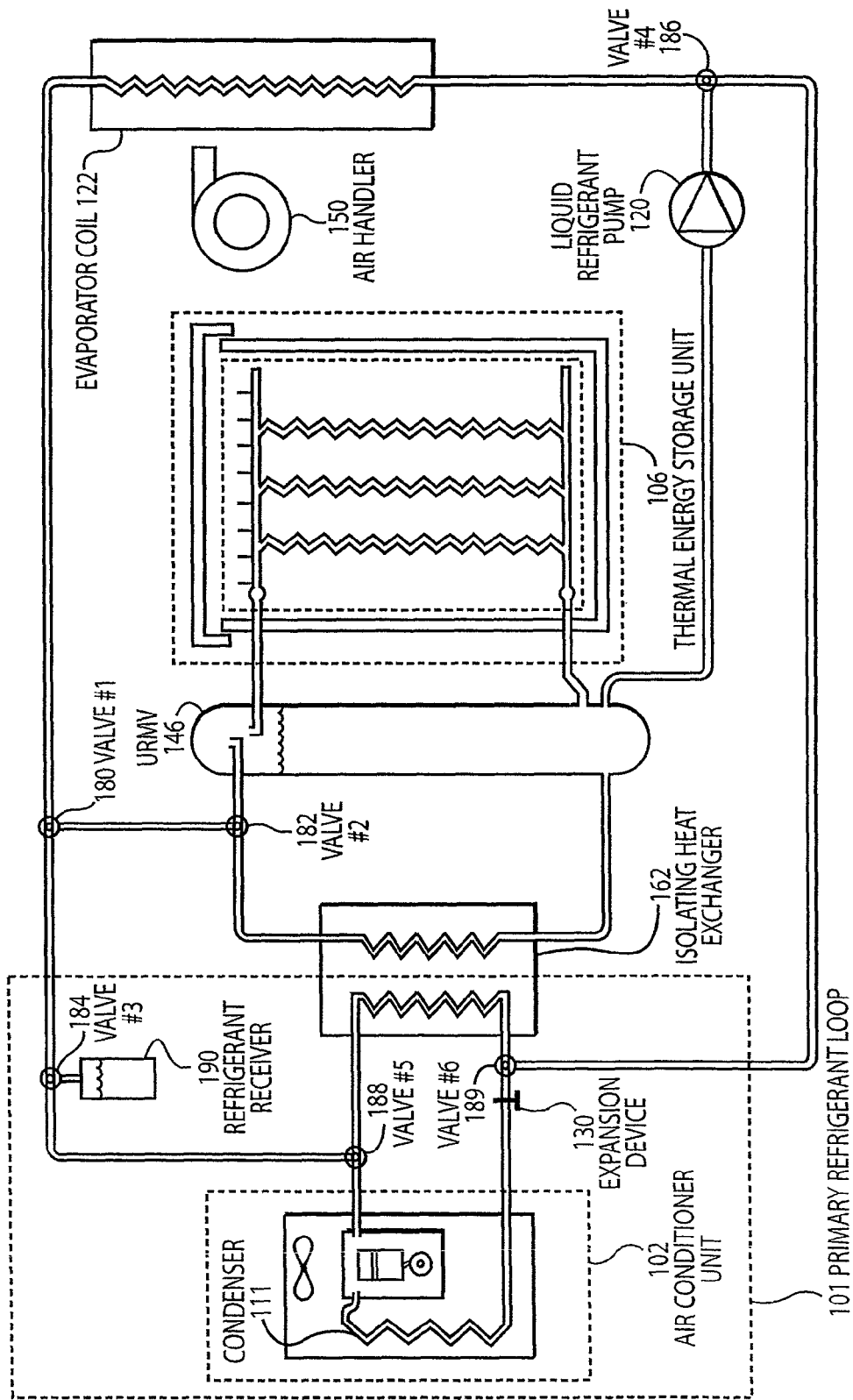
FIG. 7 illustrates another embodiment of a refrigerant-based thermal energy storage and cooling system with secondary refrigerant isolation.

FIG. 7 illustrates another embodiment of a refrigerant-based energy storage and cooling system. This embodiment deviates from the system of FIG. 1 by the location of the accumulator vessel and by the addition of a third mode of operation, a direct cooling mode that bypasses the secondary refrigeration isolation for use when direct cooling from the air conditioner unit 102 may be desirable. The embodiment of FIG. 6 utilizes the same primary refrigeration loop 101 as shown in previous embodiments but additionally adds a direct cooling loop to provide a non-isolated, direct loop to a cooling load from an air conditioner unit 102.

As with the previous bi-modal embodiments, the primary refrigerant loop 101 can be used to cool the primary side of the isolating heat exchanger 162 that transfers heat to the secondary loop. Fluid leaving the isolating heat exchanger 162 on the secondary side flows to the URMV 146 and is distributed as liquid refrigerant to either the thermal energy storage unit 106 (ice-make mode), or to the evaporator coil 122 through the liquid refrigerant pump 120 (ice-melt mode), and returned to the upper portion of the URMV 146.

In ice-make mode, cooling is transferred directly to the thermal energy storage unit 106 (acting as an evaporator) where the thermal energy is stored as ice. In ice-melt mode, cool liquid refrigerant is drawn from the thermal energy storage unit 106 through the URMV 146 and is pumped to the evaporator coil 122 where cooling is transferred to a load with the aid of an air handler 150. Warm liquid and vapor phase refrigerant leaves the evaporator coil 122 where the liquid phase is returned to the thermal energy storage unit 106 now acting as a condenser. Vapor phase refrigerant is accumulated in the upper URMV 146 and drawn into the thermal energy storage unit 106 where it is cooled and condensed with the cold fluid or ice.

With the current configuration of the energy storage and cooling system, an additional mode can be utilized which has the ability to provide non-isolated, direct cooling from the primary refrigeration loop 101 to the cooling load through the evaporator coil 122 with the aid of an air handler 150. In this mode the isolating heat exchanger 162 and the thermal energy storage unit 106 are bypassed to provide this direct cooling. As with the previously described embodiments, the principal modes of operation, ice-make, ice-melt, and direct cooling are performed with the use of a series of valves 180-189 that control the flow of refrigerant through various apparatus.

During the ice-make mode, valve #5 188 and valve #6 189 close the external loop to the evaporator coil 122 and retain the fluid within the primary refrigeration loop 101. Valves #1 180 and #4 186 are closed and valve #2 182 is open. During the ice-melt process, valve #5 188 and valve #6 189 remain in the ice-make condition retaining the fluid within the primary refrigeration loop 101. Valve #1 180 allows flow only from the evaporator coil 122 to the URMV 146 and valve #4 186 allows flow only from the liquid refrigerant pump 120 to the evaporator coil 122. During the direct cooling mode, valve #5 188 and valve #6 189 prevent flow to the isolating heat exchanger 162 and direct flow to the external loop of the evaporator coil 122. Valve #1 180 allows flow only from evaporator coil 122 to valve #3 184 that controls a refrigerant receiver 190, and flow to the air conditioner unit 102. Valve #4 186 allows flow only from the air conditioner unit 102 to the evaporator coil 122.

Figure 8:
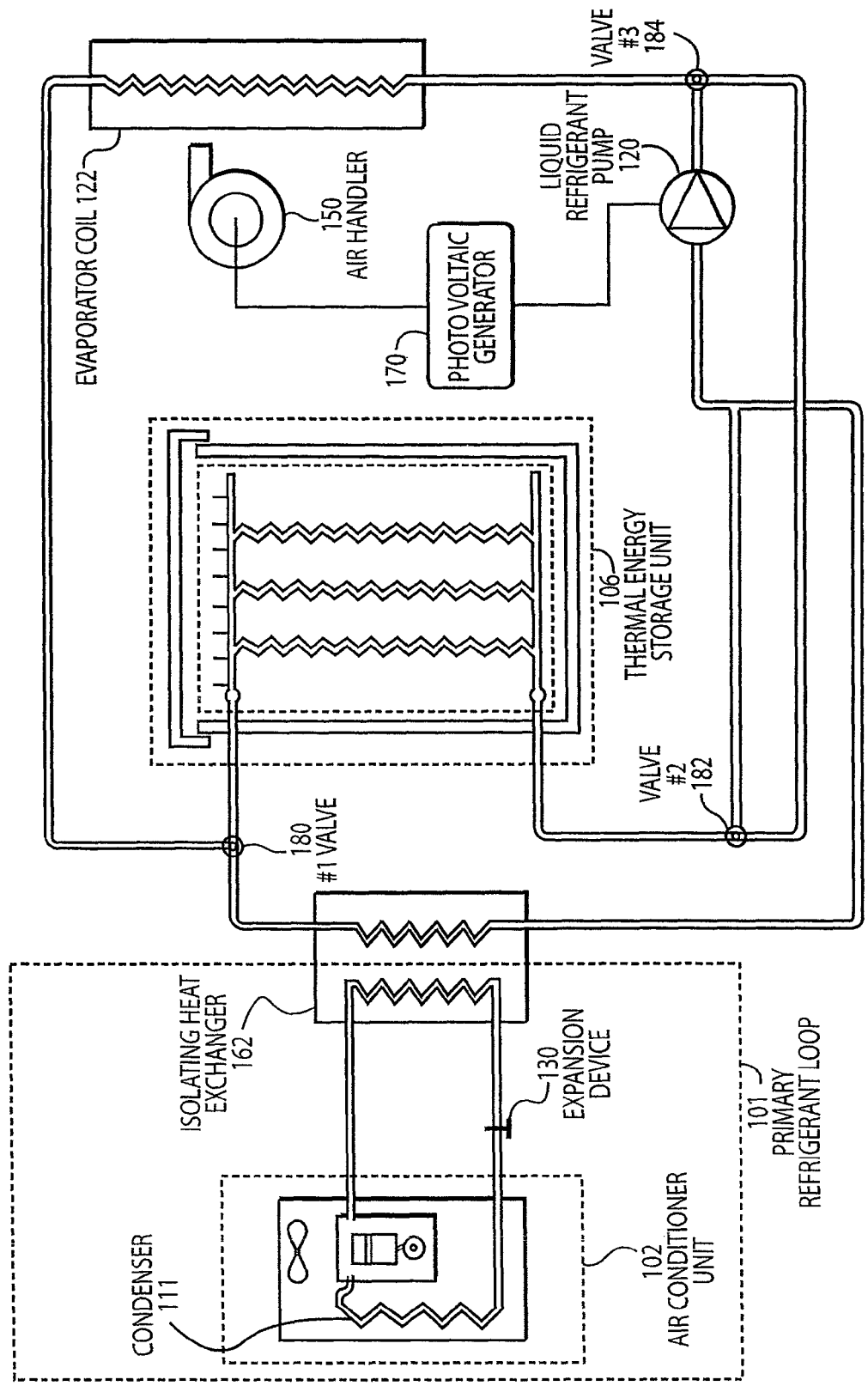
FIG. 8 illustrates an embodiment of a net-zero peak power refrigerant-based thermal energy storage and cooling system with secondary refrigerant isolation.

FIG. 8 illustrates an embodiment of a net-zero peak power refrigerant-based energy storage and cooling system with secondary refrigerant isolation. This embodiment is the system of FIG. 6 with the addition of a photovoltaic generator 170 placed within the apparatus to power the air handler 150 and the liquid refrigerant pump 120 during the ice-melt mode. This allows the system to be used during peak demand times at a net-zero power draw from a utility.

Peak usage conditions for air conditioners generally come at times when the outside temperature is very high. At such times, it is difficult for the condenser to reject internal heat to the atmosphere. By utilizing the aforementioned embodiments, systems that overcome these conditions are realized.

The disclosed systems incorporate multiple operating modes, the ability to add optional components, and the integration of smart controls that assure energy is stored at maximum efficiency. When connected to a condensing unit, the system stores refrigeration energy in a first time period, and utilizes the stored energy during a second time period to provide cooling. In addition, the condensing unit can bypass the refrigerant energy storage system to provide direct or instantaneous cooling (either isolated or not) during a third time period.

The detailed embodiments detailed above, offer numerous advantages such as minimizing additional components (and therefore, cost). In addition, the systems use very little energy beyond that used by the condensing unit to store the energy, and with the use of a photovoltaic generator, produces a net-zero power draw system during peak demand power rates. The refrigerant energy storage design has been engineered to provide flexibility so that it is practicable for a variety of applications and has further advantage over glycol or other single phase systems due to power consumption. This is because the heat load capacity of 1 lb. of refrigerant during phase change is 80 times the heat load capacity of 1$b$. of water. For example, to maintain the same heat load capacity of water (with a 10 degree F. temperature change) and refrigerant flow conditions, the power requirement for a refrigerant pump is about $\frac{1}{20}^{th}$ of a water pump. The systems described also eliminate problems with oil return to the compressor and condensing unit because the refrigerant only traverses the evaporator and the expansion valve after leaving the condensing unit. The evaporator can be designed for optimum oil drainage, keeping the compressor running smoothly. Finally, by isolating the heat exchanger module during the cooling process, the refrigerant charge can be adjusted optimally for each operating condition, ice making and cooling.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A thermal energy storage and cooling system comprising:
   a refrigerant loop comprising:
   a condensing unit, said condensing unit comprising a compressor and a condenser;
   an expansion device connected downstream of said condensing unit; and,
   an evaporator on a primary side of an isolating heat exchanger located downstream of said expansion device;
   a cooling loop on a secondary side of said isolating heat exchanger in thermal communication with said primary side of said isolating heat exchanger comprising:
   a tank filled with a fluid capable of a phase change between liquid and solid and containing a primary heat exchanger therein, said primary heat exchanger in thermal communication with said secondary side of said isolating heat exchanger, said cooling loop that allows transfer of cooling from said secondary side of said isolating heat exchanger to said primary heat exchanger to cool said fluid and to freeze at least a portion of said fluid within said tank in a first time period, said cooling loop that allows transfer of cooling from said primary heat exchanger to said secondary side of said isolating heat exchanger to cool said primary side of said isolating heat exchanger in a second time period; and,
   a load heat exchanger in thermal communication with said isolating heat exchanger and said condensing unit that allows cooling capacity to be transferred from said condensing unit to said load heat exchanger or said primary heat exchanger to said load heat exchanger.

2. The system of claim 1 wherein said expansion device is a thermal expansion valve.

3. The system of claim 1 wherein said refrigerant loop further comprises:
   a refrigerant receiver for accumulation and storage of said first refrigerant.

4. The system of claim 1 wherein said expansion device is a mixed-phase regulator.

5. The system of claim 1 wherein said fluid is a eutectic material.

6. The system of claim 1 wherein said fluid is water.

7. The system of claim 1 further comprising:
   an air handler unit that assists in distributing cooling from said load heat exchanger to said heat load; and,
   a photovoltaic power source for powering said liquid refrigeration pump and said air handler.

8. The system of claim 1 further comprising:
   a valve structure that facilitates cooling capacity to be transferred from said condensing unit to said primary heat exchanger and prohibiting cooling capacity to be transferred from said condensing unit to said load heat exchanger.

9. The system of claim 1 further comprising:
   a valve structure that facilitates cooling capacity to be transferred from said condensing unit to said load heat exchanger and prohibiting cooling capacity to be transferred from said condensing unit to said primary heat exchanger.

10. The system of claim 1 further comprising:
    a valve structure that facilitates cooling capacity to be transferred from said primary heat exchanger to said load heat exchanger.

11. The system of claim 1 further comprising:
    a refrigerant receiver for accumulation and storage of said first refrigerant.

12. The system of claim 1 wherein said load heat exchanger is at least one mini-split evaporator.

13. The system of claim 1 wherein said load heat exchanger is a plurality of evaporators.

14. A method of providing load cooling with a thermal energy storage and cooling system comprising:
    storing cooling capacity in a first time period comprising:
    compressing and condensing a refrigerant with a condensing unit in a refrigerant loop;
    expanding said refrigerant downstream of said condensing unit; and,
    evaporating said refrigerant on a primary side of an isolating heat exchanger located downstream of said expansion device;
    transferring cooling from said expanded refrigerant to a secondary side of said isolating heat exchanger;
    transferring cooling from said secondary side of said isolating heat exchanger to a primary heat exchanger located in a tank filled with a fluid capable of a phase change between liquid and solid; and, transferring cooling from said primary heat exchanger to said fluid to freeze at least a portion of said fluid within said tank to provide stored cooling capacity;

utilizing said stored cooling capacity in a second time period comprising:

transferring cooling from said fluid to said primary heat exchanger;

transferring cooling from said primary heat exchanger to said isolating heat exchanger; and, transferring cooling from said isolating heat exchanger to a load heat exchanger;

providing direct cooling in a third time period comprising:

compressing and condensing said refrigerant with said condensing unit in said refrigerant loop;

expanding said refrigerant downstream of said condensing unit; and, evaporating said refrigerant downstream of said expansion device; and, transferring cooling from said expanded refrigerant to said load heat exchanger.

15. The method of claim 14 further comprising the step:

expanding said refrigerant downstream of said condensing unit with a thermal expansion valve in said first time period or said third time period.

16. The method of claim 14 further comprising the step:

accumulating and storing said refrigerant with a refrigerant receiver.

17. The method of claim 14, wherein said step of transferring cooling from said expanded refrigerant to said load heat exchanger further comprises:

distributing cooling from said load heat exchanger to said heat load with an air handler unit.

18. The method of claim 14, wherein said step of transferring cooling from said expanded refrigerant to said load heat exchanger further comprises:

transferring cooling from said expanded refrigerant to at least one mini-split evaporator.

19. The method of claim 14, wherein said step of transferring cooling from said expanded refrigerant to said load heat exchanger further comprises:

transferring cooling from said expanded refrigerant to a plurality of evaporators.

20. A means for providing load cooling with a thermal energy storage and cooling system comprising:

a means for storing cooling capacity in a first time period comprising:

a means for compressing and condensing a refrigerant with a condensing unit in a refrigerant loop;

a means for expanding said refrigerant downstream of said condensing unit; and, a means for evaporating said refrigerant on a primary side of an isolating heat exchanger located downstream of said expansion device;

a means for transferring cooling from said expanded refrigerant to a secondary side of said isolating heat exchanger;

a means for transferring cooling from said secondary side of said isolating heat exchanger to a primary heat exchanger located in a tank filled with a fluid capable of a phase change between liquid and solid; and, a means for transferring cooling from said primary heat exchanger to said fluid to freeze at least a portion of said fluid within said tank to provide stored cooling capacity;

a means for utilizing said stored cooling capacity in a second time period comprising:

a means for transferring cooling from said fluid to said primary heat exchanger;

a means for transferring cooling from said primary heat exchanger to said isolating heat exchanger; and, a means for transferring cooling from said isolating heat exchanger to a load heat exchanger;

a means for providing direct cooling in a third time period comprising:

a means for compressing and condensing said refrigerant with said condensing unit in said refrigerant loop;

a means for expanding said refrigerant downstream of said condensing unit; and, a means for evaporating said refrigerant downstream of said expansion device; and, transferring cooling from said expanded refrigerant to said load heat exchanger.

* * * * *